US008330427B2

(12) United States Patent
Taniguchi et al.

(10) Patent No.: US 8,330,427 B2
(45) Date of Patent: Dec. 11, 2012

(54) CHARGE CONTROL CIRCUIT, AND CHARGING DEVICE AND BATTERY PACK INCORPORATED WITH THE SAME

(75) Inventors: Akihiro Taniguchi, Hyogo (JP); Takuma Iida, Osaka (JP); Takuya Nakashima, Osaka (JP)

(73) Assignee: Panasonic Corporation, Osaka (JP)

( * ) Notice: Subject to any disclaimer, the term of this patent is extended or adjusted under 35 U.S.C. 154(b) by 342 days.

(21) Appl. No.: 12/918,264

(22) PCT Filed: Jan. 6, 2009

(86) PCT No.: PCT/JP2009/000015
§ 371 (c)(1),
(2), (4) Date: Aug. 18, 2010

(87) PCT Pub. No.: WO2009/104348
PCT Pub. Date: Aug. 27, 2009

(65) Prior Publication Data
US 2010/0327818 A1    Dec. 30, 2010

(30) Foreign Application Priority Data
Feb. 18, 2008    (JP) .................................. 2008-036005

(51) Int. Cl.
*H02J 7/04*    (2006.01)
*H02J 7/00*    (2006.01)
(52) U.S. Cl. ......................... 320/162; 320/134; 320/148
(58) Field of Classification Search .................. 320/162, 320/148
See application file for complete search history.

(56) References Cited

U.S. PATENT DOCUMENTS

| 5,408,170 | A |   | 4/1995  | Umetsu et al. |
|-----------|---|---|---------|---------------|
| 5,764,033 | A | * | 6/1998  | Tamai ........................... 320/132 |
| 6,124,700 | A |   | 9/2000  | Nagai et al. |
| 6,127,810 | A |   | 10/2000 | Sato et al. |
| 6,307,353 | B1| * | 10/2001 | Shiojima ....................... 320/139 |
| 7,023,180 | B2| * | 4/2006  | Nagai et al. .................... 320/162 |
| 8,035,353 | B2| * | 10/2011 | Van Der Velden ............ 320/157 |

(Continued)

FOREIGN PATENT DOCUMENTS
CN    1357957 A    7/2002
(Continued)

OTHER PUBLICATIONS

Chinese Office Action issued in Chinese Patent Application No. 200980104550.5 dated Aug. 17, 2012.

*Primary Examiner* — M'Baye Diao
(74) *Attorney, Agent, or Firm* — McDermott Will & Emery LLP

(57) ABSTRACT

A charge control circuit including a voltage detection section which detects a terminal voltage of a secondary battery; a primary charge processing section which performs a charge processing of acquiring, as a first terminal voltage, a terminal voltage detected by the voltage detection section while causing a charging section to charge the secondary battery; a charging suspend voltage acquiring section which causes the charging section to suspend the charge after the first terminal voltage has been acquired by the primary charge processing section, and acquires, as a second terminal voltage, a terminal voltage detected by the voltage detection section in a state that the charge is suspended; and a charging end determining section which determines whether or not the charge of the secondary battery is to be terminated.

10 Claims, 7 Drawing Sheets

U.S. PATENT DOCUMENTS

2008/0111523 A1 * 5/2008 Kim .............................. 320/162

FOREIGN PATENT DOCUMENTS

| EP | 0902522 A2 | 3/1999 |
|---|---|---|
| JP | 6-014473 | 1/1994 |
| JP | 8-140281 | 5/1996 |
| JP | 8-168192 | 6/1996 |
| JP | 11-150884 | 6/1999 |
| JP | 2004-111242 | 4/2004 |
| JP | 2007-250299 | 9/2007 |

* cited by examiner

CHARGE CONTROL CIRCUIT, AND CHARGING DEVICE AND BATTERY PACK INCORPORATED WITH THE SAME

RELATED APPLICATIONS

This application is the U.S. National Phase under 35 U.S.C. §371 of International Application No. PCT/JP2009/000015, filed on Jan. 6, 2009, which in turn claims the benefit of Japanese Application No. 2008-036005, filed on Feb. 18, 2008, the disclosures of which Applications are incorporated by reference herein.

TECHNICAL FIELD

The invention relates to a charge control circuit that controls a charge of a secondary battery, and a charging device and a battery pack incorporated with the same.

BACKGROUND ART

In recent years, a secondary battery is widely used as a power source system in cooperation with a photovoltaic cell or a power generating device. The power generating device is driven by a natural energy such as a wind power or a hydraulic power, or an artificial power such as internal combustion engine. The power source system incorporated with the secondary battery is configured in such a manner that a surplus electric power is accumulated in the secondary battery, and an electric power is supplied from the secondary battery when a load device requires an electric power to thereby enhance the energy efficiency.

An example of the power source system is a photovoltaic power generating system. The photovoltaic power generating system is configured in such a manner that a secondary battery is charged with a surplus electric power, in the case where the amount of electric power to be generated by the sunlight is larger than the electric power consumption of a load device. Conversely, in the case where the amount of electric power to be generated by the sunlight is smaller than the electric power consumption of a load device, an electric power is outputted from the secondary battery to compensate for the shortage of electric power to drive the load device.

As described above, since a surplus electric power which has not been conventionally used can be accumulated in a secondary battery, the photovoltaic power generating system is advantageous in enhancing the energy efficiency, as compared with a conventional power source system which does not use a secondary battery.

In such a photovoltaic power generating system, if a secondary battery is in a full charge state, it is impossible to charge a surplus electric power, which causes electric power loss. In view of this, charge control is performed so that a state of charge (hereinafter, called as SOC) of a secondary battery does not reach 100% in order to efficiently charge the secondary battery with a surplus electric power. Charge control is also performed to keep the SOC from becoming zero so as to be able to drive a load device when needed. Specifically, charge control is normally performed in such a manner that the SOC is kept in the range from 20% to 80%.

A hybrid electric vehicle (HEV) loaded with an engine and a motor also utilizes the above principle. The HEV is configured in such a manner that a power generator is driven by a surplus output of the engine to charge a secondary battery, in the case where the output from the engine is large as compared with a power required for driving the HEV. The HEV is also configured in such a manner that the secondary battery is charged by using the motor as a power generator at the time of braking or decelerating the vehicle.

A load leveling power source or a plug-in hybrid vehicle effectively utilizing the nighttime electric power has also attracted attention in recent years. The load leveling power source is a system, wherein an electric power is stored in a secondary battery during the nighttime when the electric power consumption is small and the electricity rate is low, and the stored electric power is used during the daytime when the electric power consumption reaches its highest peak. The system is proposed to make the electric power generation amount constant by making the electric power consumption amount uniform, thereby contributing to efficient utilization of an electric power facility and reduction of the facility investment.

The plug-in hybrid vehicle is proposed to reduce the total $CO_2$ emission, utilizing nighttime electric power. Specifically, the plug-in hybrid vehicle primarily performs EV driving of supplying an electric power from a secondary battery while driving an urban area where the gasoline mileage is low, and performs HEV driving of using both an engine and a motor during a long distance driving.

Incidentally, a secondary battery is degraded and the capacity thereof is reduced, as it is used. Accordingly, it is important to accurately determine the SOC of the secondary battery. For instance, if one fails to accurately determine the SOC of a secondary battery, and the secondary battery is overcharged, the long-term reliability such as the life of the secondary battery may be impaired. In view of this, it is necessary to precisely determine the SOC of a secondary battery in use, particularly, determine whether or not the secondary battery is in a near full charge state to perform charge control.

FIG. 7 is a graph showing a relation between an SOC and a terminal voltage of a secondary battery. In FIG. 7, the axis of abscissas denotes an SOC, and the axis of ordinate denotes a terminal voltage of a secondary battery in a non-load state, in other words, an open circuit voltage (OCV). As shown by the graph G1 in FIG. 7, a terminal voltage of a secondary battery is increased, as charging progresses and the SOC is increased, generally. Consequently, the SOC is detected by converting a terminal voltage of a secondary battery into the SOC, utilizing the characteristic as shown in the graph G1, conventionally.

However, as shown by the graph G2 in FIG. 7 for instance, some of the secondary batteries have a flat voltage characteristic that a change in the terminal voltage is small, as compared with a change in the SOC. In case of a secondary battery whose change in the terminal voltage is flat as compared with a change in the SOC au just described, the terminal voltage is moderately changed as compared with a change in the SOC. Accordingly, detecting the SOC based on the terminal voltage may result in lowering detection precision of the SOC. If charge control is performed based on the SOC having a low detection precision, there has been a problem that it is impossible to properly charge the secondary battery.

For instance, there may be a case that the SOC is erroneously determined to be 80%, despite that the SOC is actually 20%. In such a case, since the SOC is erroneously determined, charging is not performed, despite that discharging progresses and the SOC is becoming lowered. As a result, charging becomes insufficient, the dischargeable time is reduced, and the battery cannot deliver its performance fully. Conversely, there may be a case that the SOC is erroneously determined to be 20%, despite that the SOC is actually 80%. In such a case, extra charging is performed in excess of a full charge state, and there is a possibility that overcharge is performed. In that event, the life and the reliability of the battery may be impaired.

In order to solve the problems, there is proposed e.g. a method for easily detecting the SOC of a battery by using positive electrode materials of two or more kinds in a mixed state for enhancing detection precision of the SOC (see e.g. patent literature 1). The publication discloses that having two or more kinds of quasi-flat voltage portions of different voltage levels is advantageous in enhancing detection precision of the SOC. When there are a large number of quasi-flat voltage portions of different voltage levels, the gradient of a charging voltage is apparently large as compared with a change in the SOC in broad perspective.

However, in the technology disclosed in patent literature 1, since positive electrode materials of two or more kinds are used to enhance detection precision of the SOC, a battery characteristic is varied as compared with a secondary battery using a positive electrode material of one kind. As a result, it may be impossible or difficult to obtain an intended battery characteristic.

Patent Literature 1
JP-A-2007-250299

SUMMARY OF THE INVENTION

The invention is made in view of the above, and an object of the invention is to provide a charge control circuit that enables to enhance precision of charge control with respect to a secondary battery having a small change in a terminal voltage, as compared with a change in an SOC, and a charging device and a battery pack incorporated with the charge control circuit.

A charge control circuit according to an aspect of the invention is a charge control circuit that controls a charging section which charges a secondary battery by supplying a charging current to the secondary battery, the charge control circuit comprising: a voltage detection section which detects a terminal voltage of the secondary battery; a primary charge processing section which performs a charge processing of acquiring, as a first terminal voltage, a terminal voltage detected by the voltage detection section while causing the charging section to charge the secondary battery; a charging suspend voltage acquiring section which causes the charging section to suspend the charge after the first terminal voltage has been acquired by the primary charge processing section, and acquires, as a second terminal voltage, a terminal voltage detected by the voltage detection section in a state that the charge is suspended; and a charging end determining section which determines whether or not the charge of the secondary battery is to be terminated, based on a difference between the first terminal voltage acquired by the primary charge processing section and the second terminal voltage acquired by the charging suspend voltage acquiring section.

In the above arrangement, the primary charge processing section acquires, as a first terminal voltage, a terminal voltage of the secondary battery in a state that a charging current is supplied to the secondary battery. The charging suspend voltage acquiring section acquires, as a second terminal voltage, a terminal voltage of the secondary battery in a state that supply of the charging current is suspended. The charging end determining section determines whether or not the charge of the secondary battery is to be terminated, based on a difference between the first terminal voltage and the second terminal voltage. The difference between the first terminal voltage and the second terminal voltage is changed in accordance with the SOC of the secondary battery. Accordingly, even if a secondary battery having a small change in the terminal voltage, as compared with a change in the SOC is used, it is possible to enhance precision of charge control, as compared with charge control based on an SOC which is directly converted from a terminal voltage, by determining whether or not the charge is to be terminated based on a difference between the first terminal voltage and the second terminal voltage.

A charging device according to an aspect of the invention includes the aforementioned charge control circuit, and the charging section.

In the above arrangement, it is possible to provide the charging device with enhanced precision of charge control with respect to a secondary battery having a small change in the terminal voltage, as compared with a change in the SOC.

A battery pack according to an aspect of the invention includes the aforementioned charge control circuit, and the secondary battery.

In the above arrangement, it is possible to provide the battery pack with enhanced precision of charge control with respect to a secondary battery having a small change in the terminal voltage, as compared with a change in the SOC.

BEST MODE FOR CARRYING OUT THE INVENTION

Figure 1:
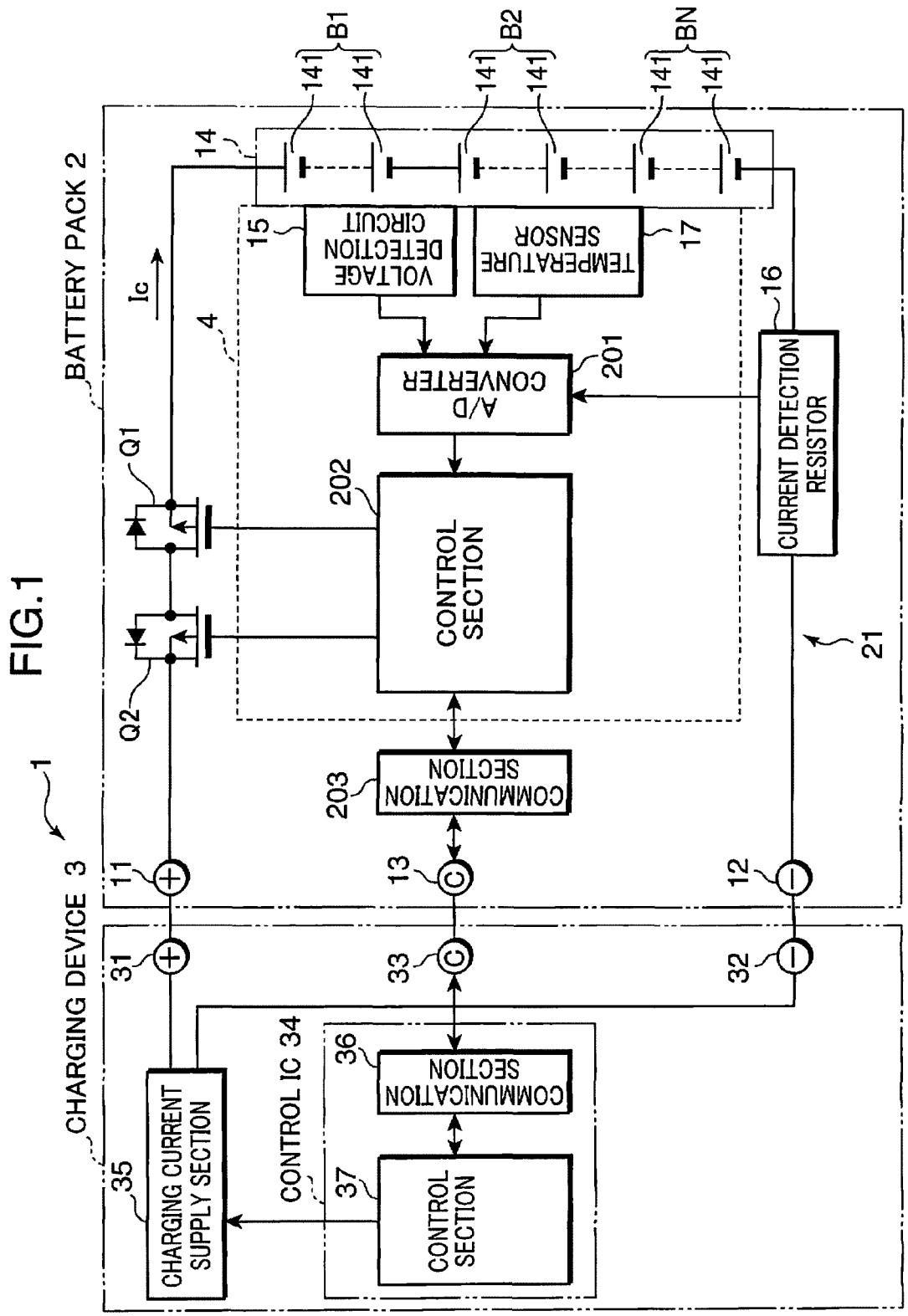
FIG. 1 is a block diagram showing an example of an arrangement of a battery pack and a charging system incorporated with a charge control circuit in accordance with an embodiment of the invention.

In the following, an embodiment of the invention is described referring to the accompanying drawings. Elements having the same reference numerals throughout the drawings have the same arrangements, and repeated description thereof is omitted herein. FIG. 1 is a block diagram showing an example of an arrangement of a battery pack and a charging system incorporated with a charge control circuit in accordance with an embodiment of the invention. A charging system 1 shown in FIG. 1 is constituted of a battery pack 2 and a charging device 3 (a charging section).

The charging system 1 may be constituted as a battery loaded device system such as electronic devices including a mobile personal computer, a digital camera, and a mobile phone; and vehicles including an electric vehicle and a hybrid electric vehicle, including an unillustrated load device for receiving an electric power from the battery pack 2. In the above arrangement, the battery pack 2 may be attached to the load device and charged through the load device, in place of the arrangement shown in FIG. 1, wherein the battery pack 2 is charged by the charging device 3.

The battery pack 2 includes connection terminals 11, 12, and 13, an assembled cell 14 (secondary batteries), a current detection resistor 16, a charge control circuit 4, a communication section 203, and switching elements Q1 and Q2. Further, the charge control circuit 4 has an analog-digital (A/D) converter 201, a control section 202, a voltage detection circuit 15 (a voltage detection section), and a temperature sensor 17 (a temperature detection section).

The charging system 1 is not limited to the arrangement that the charging system 1 is constituted of the battery pack 2 and the charging device 3 as individual elements, but the charging system 1 as a whole may be constituted of the charge control circuit 4. Further alternatively, a part of the charge control circuit 4 may be provided in the battery pack 2, and the remainder of the charge control circuit 4 may be provided in the charging device 3. Further alternatively, the charge control circuit 4 may constitute an electric control unit (ECU) to be loaded in a vehicle, in place of the arrangement that the assembled cell 14 is provided in the battery pack 2.

The charging device 3 includes connection terminals 31, 32, and 33, a control IC 34, and a charging current supply section 35. The control IC 34 has a communication section 36 and a control section 37. The charging current supply section 35 is a power source circuit for supplying a current in accordance with a control signal from the control section 37 to the battery pack 2 through the connection terminals 31 and 32. The control section 37 is a control circuit constituted of e.g. a microcomputer.

The battery pack 2 and the charging device 3 are connected to each other between the connection terminals 11 and 31 on a high DC voltage side for electric power supply, between the connection terminals 13 and 33 for communication signals, and between the connection terminals 12 and 32 for electric power supply and communication signals. The communication sections 203 and 36 are communication interface circuits configured to transmit and receive data to and from each other through the connection terminals 13 and 33.

The battery pack 2 is configured in such a manner that the connection terminal 11 is connected to a positive electrode of the assembled cell 14 through the switching element Q2 for a charge and the switching element Q1 for a discharge. P-channel field effect transistors (FETs) for instance are used as the switching elements Q1 and Q2. The switching element Q1 is constructed in such a manner that a cathode of a parasitic diode is aligned with a direction of the assembled cell 14. The switching element Q2 is constructed in such a manner that a cathode of a parasitic diode is aligned with a direction of the connection terminal 11.

The connection terminal 12 is connected to a negative electrode of the assembled cell 14 through the current detection resistor 16, and a current path from the connection terminal 11 to the connection terminal 12 through the switching elements Q2 and Q1, the assembled cell 14, and the current detection resistor 16 is defined. The current detection resistor 16 converts a charging current and a discharging current of the assembled cell 14 into a voltage value.

The assembled cell 14 is constituted of e.g. plural battery blocks (secondary batteries) B1, B2, . . . , and BN connected to each other in series. Each of the battery blocks B1, B2, . . . , and BN is constituted by e.g. connecting plural secondary batteries 141 in series. Alternatively, the assembled cell 14 may be a cell e.g., may be an assembled cell constituted by connecting plural secondary batteries in parallel to each other, or may be an assembled cell constituted by connecting series-connected secondary batteries and parallel-connected secondary batteries in combination.

The secondary battery 141 is e.g. a lithium ion secondary battery, wherein an exemplified olivine-based material i.e. $LiFePO_4$ is used as a positive electrode active material. The positive electrode active material may be e.g. $Li_xFePO_4$ (where $0<x\leq1$).

Figure 7:
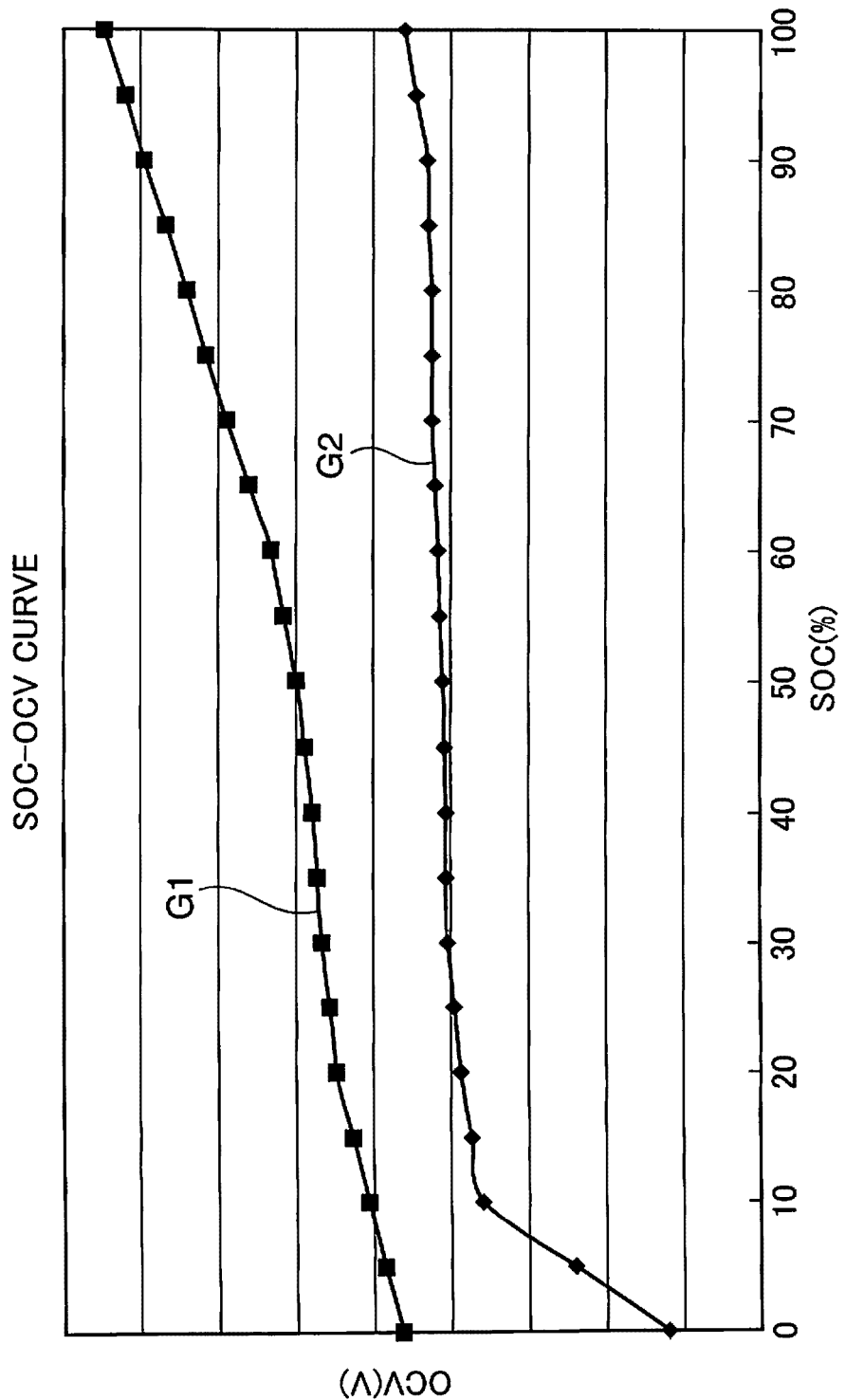
FIG. 7 is a graph showing a relation between an SOC and a terminal voltage of a secondary battery.

As shown by e.g. the graph G2 in FIG. 7, the lithium ion secondary battery using $LiFePO_4$ as a positive electrode active material has a flat voltage characteristic that a change in the terminal voltage is small, as compared with a change in the SOC in a wide range. For instance, the secondary battery 141 may be a secondary battery, wherein an amount of change in the terminal voltage is not smaller than 0.01 V but smaller than 0.3 V, in the case where the SOC is changed from 10% to 95%.

Figure 3:
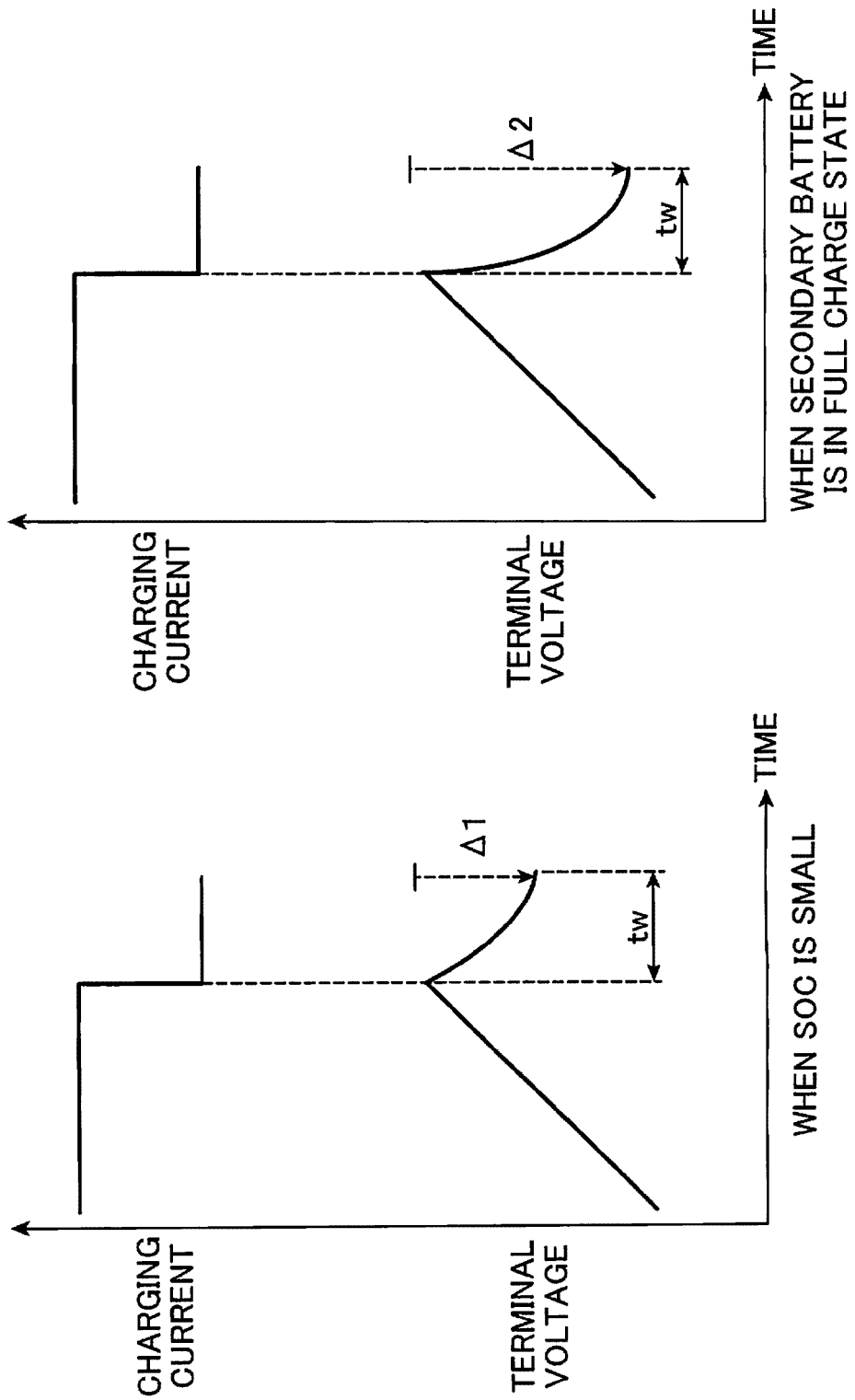
FIG. 3 is a diagram for describing a change in a terminal voltage, in the case where a charging current is set to zero after the charging current is supplied to a secondary battery shown in FIG. 1.

The inventors of the present application have found through the experiments that, as shown in FIG. 3, a lithium ion secondary battery using $LiFePO_4$ as a positive electrode active material has a characteristic that an amount of decrease in the terminal voltage at the time of suspending a charge is increased, as the SOC is increased.

FIG. 3 is a diagram for describing a change in the terminal voltage, in the case where a charging current is set to zero after the charging current is supplied to the secondary battery 141. As shown in FIG. 3, as a charging current flows, the terminal voltage of the secondary battery 141 using $LiFePO_4$ as a positive electrode active material is gradually increased. Then, after the charging current becomes zero, the terminal voltage is gradually decreased, and when a time "tw" has elapsed, the terminal voltage becomes a constant level and is stabilized.

The inventors of the application have found through the experiments that a difference ($\Delta 2$) between a terminal voltage at a point of time immediately before the charging current becomes zero, and a stabilized terminal voltage after having decreased in a condition that the secondary battery 141 is in a full charge state is larger than a corresponding difference ($\Delta 1$) in a condition that the SOC of the secondary battery 141 is small.

The temperature sensor 17 is a temperature sensor for detecting a temperature of the assembled cell 14. The temperature of the assembled cell 14 is detected by the temperature sensor 17, and the detected temperature is inputted to the analog-digital converter 201 in the charge control circuit 4. Terminal voltages Vb1, Vb2, . . . , and VbN of the battery blocks B1, B2, . . . , and BN are respectively detected by the voltage detection circuit 15, and the detected terminal voltages are inputted to the analog-digital converter 201 in the charge control circuit 4.

A current value of a charging/discharging current Ic detected by the current detection resistor 16 is also inputted to the analog-digital converter 201 in the charge control circuit 4. The analog-digital converter 201 converts the respective input values into digital values, and outputs the digital values to the control section 202.

Figure 2:
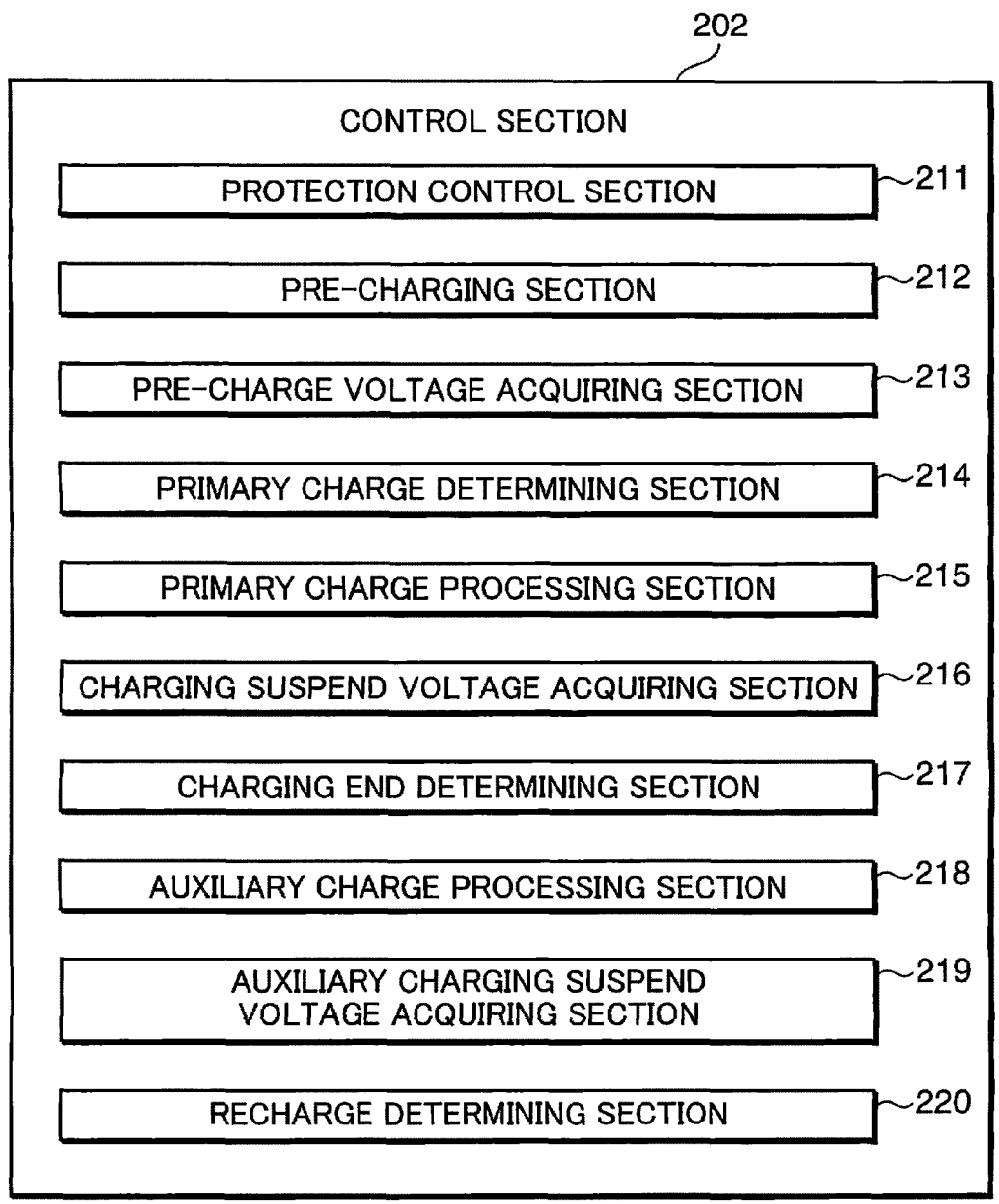
FIG. 2 is a block diagram for describing an example of an arrangement of a control section shown in FIG. 1.

FIG. 2 is a block diagram for describing an example of an arrangement of the control section 202 shown in FIG. 1. The control section 202 is constituted of e.g. a central processing unit (CPU) for executing a predetermined computation processing, a read only memory (ROM) storing a predetermined control program, a random access memory (RAM) for temporarily storing data, a timer circuit, and peripheral circuits in the periphery of these components. The control section 202 functions as a protection control section 211, a pre-charging section 212, a pre-charge voltage acquiring section 213, a primary charge determining section 214, a primary charge processing section 215, a charging suspend voltage acquiring section 216, a charging end determining section 217, an auxiliary charge processing section 218, an auxiliary charging suspend voltage acquiring section 219, and a recharge determining section 220 by executing the control program stored in the ROM.

The protection control section 211 detects an anomaly in the exterior of the battery pack 2 such as a short circuit between the connection terminals 11 and 12, and an anomalous current flow from the charging device 3; and an anomaly such as an anomalous temperature rise of the assembled cell 14, based on the respective input values from the analog-digital converter 201. Specifically, for instance, if a current value detected by the current detection resistor 16 has exceeded a predetermined threshold value for anomalous current detection, it is determined that an anomaly resulting from a short circuit between the connection terminals 11 and 12 or an anomalous current flow from the charging device 3 has occurred. Further, for instance, if a temperature of the assembled cell 14 detected by the temperature sensor 17 has exceeded a predetermined threshold value for detecting an anomalous temperature rise, it is determined that an anomaly has occurred in the assembled cell 14. In the case where such an anomaly has been detected, the protection control section 211 controls the switching elements Q1 and Q2 to turn off the switching elements Q1 and Q2 so as to protect the assembled cell 14 from an anomaly such as an overcurrent flow or an overheat.

The pre-charging section 212 transmits a signal requesting a charging current of a current value Ipc (a current value for a pre-charge) which is smaller than a current value Icc (a current value for a primary charge) from the communication section 203 to the charging device 3 through the connection terminals 13 and 32, before a charge processing by the primary charge processing section 215 is performed. Accordingly, the pre-charging section 212 acquires terminal voltages Vb1, Vb2, ..., and VbN which have been detected by the voltage detection circuit 15 as third terminal voltages V3b1, V3b2, ..., and V3bN, while causing the charging device 3 to pre-charge the assembled cell 14.

Here, a current value where the remaining capacity of the secondary battery 141 having a nominal capacity value becomes zero one hour after the secondary battery 141 has been discharged with a constant current is defined as 1 C (=1 It=battery capacity (Ah)/1(h)). The current value Icc is set to e.g. 0.7 C.

The pre-charge voltage acquiring section 213 transmits a signal requesting to suspend a charge to the charging device 3, after the third terminal voltages V3b1, V3b2, ..., and V3bN have been acquired by the pre-charging section 212. Then, the pre-charge voltage acquiring section 213 acquires terminal voltages Vb1, Vb2, ..., and VbN which have been detected by the voltage detection circuit 15 in a state that the charge by the charging device 3 is suspended, as fourth terminal voltages V4b1, V4b2, ..., and V4bN.

The primary charge determining section 214 determines whether or not a charge processing by the primary charge processing section 215 is to be performed, based on respective differences between the third terminal voltages V3b1, V3b2, ..., and V3bN acquired by the pre-charging section 212 and the fourth terminal voltages V4b1, V4b2, ..., and V4bN acquired by the pre-charge voltage acquiring section 213 with respect to each of the battery blocks B1, B2, ..., and BN.

The primary charge processing section 215 performs a charge processing to acquire terminal voltages Vb1, Vb2, ..., and VbN detected by the voltage detection circuit 15 as first terminal voltages V1b1, V1b2, ..., and V1bN, while causing the charging device 3 to charge the assembled cell 14.

The charging suspend voltage acquiring section 216 causes the charging device 3 to suspend the charge after the first terminal voltages V1b1, V1b2, ..., and V1bN have been acquired by the primary charge processing section 215, and acquires terminal voltages Vb1, Vb2, ..., and VbN which have been detected by the voltage detection circuit 15 as second terminal voltages V2b1, V2b2, ..., and V2bN in a state that the charge is suspended.

The charging end determining section 217 determines whether or not the charge of the assembled cell 14 is to be terminated, based on respective differences between the first terminal voltages V1b1, V1b2, ..., and V1bN acquired by the primary charge processing section 215 and the second terminal voltages V2b1, V2b2, ..., and V2bN acquired by the charging suspend voltage acquiring section 216.

The auxiliary charge processing section 218 performs an auxiliary charge e.g. a trickle charge, after the assembled cell 14 has been temporarily brought to a full charge state and a charge has been terminated, to compensate for a decrease in the SOC resulting from e.g. self discharging of the assembled cell 14. Specifically, the auxiliary charge processing section 218 acquires terminal voltages Vb1, Vb2, ..., and VbN which have been detected by the voltage detection circuit 15 as fifth terminal voltages V5b1, V5b2, ..., and V5bN, while causing the charging device 3 to charge the assembled cell 14, every predetermined time interval tcyc, after the charging end determining section 217 has determined that a charge of the assembled cell 14 is to be terminated.

The auxiliary charging suspend voltage acquiring section 219 causes the charging device 3 to suspend the charge after the fifth terminal voltages V5b1, V5b2, ..., and V5bN have been acquired by the auxiliary charge processing section 218, and acquires terminal voltages Vb1, Vb2, ..., and VbN which have been detected by the voltage detection circuit 15 as sixth terminal voltages V6b1, V6b2, ..., and V6bN in a state that a charge is suspended.

The recharge determining section 220 determines whether or not an auxiliary charge and acquisition of the fifth terminal voltages V5b1, V5b2, ..., and V5bN by the auxiliary charge processing section 218 is to be resumed, based on respective differences between the fifth terminal voltages V5b1, V5b2, ..., and V5bN acquired by the auxiliary charge processing section 218 and the sixth terminal voltages V6b1, V6b2, ..., and V6bN acquired by the auxiliary charging suspend voltage acquiring section 219.

In the charging device 3, the communication section 36 in the control IC 34 receives a request from the control section 202, the control section 37 in the control IC 34 controls the charging current supply section 35 to output a charging current with a voltage value and a current value in accordance with the request from the control section 202. The charging current supply section 35 is constituted of a switching power source circuit such as an AC-DC converter and a DC-DC converter. The charging current supply section 35 generates a charging voltage and a charging current designated by the control section 37, based on e.g. a voltage from a commercial AC power source, and supplies the charging voltage and the charging current to the battery pack 2 through the connection terminals 31 and 11, and the connection terminals 32 and 12.

Figure 4:
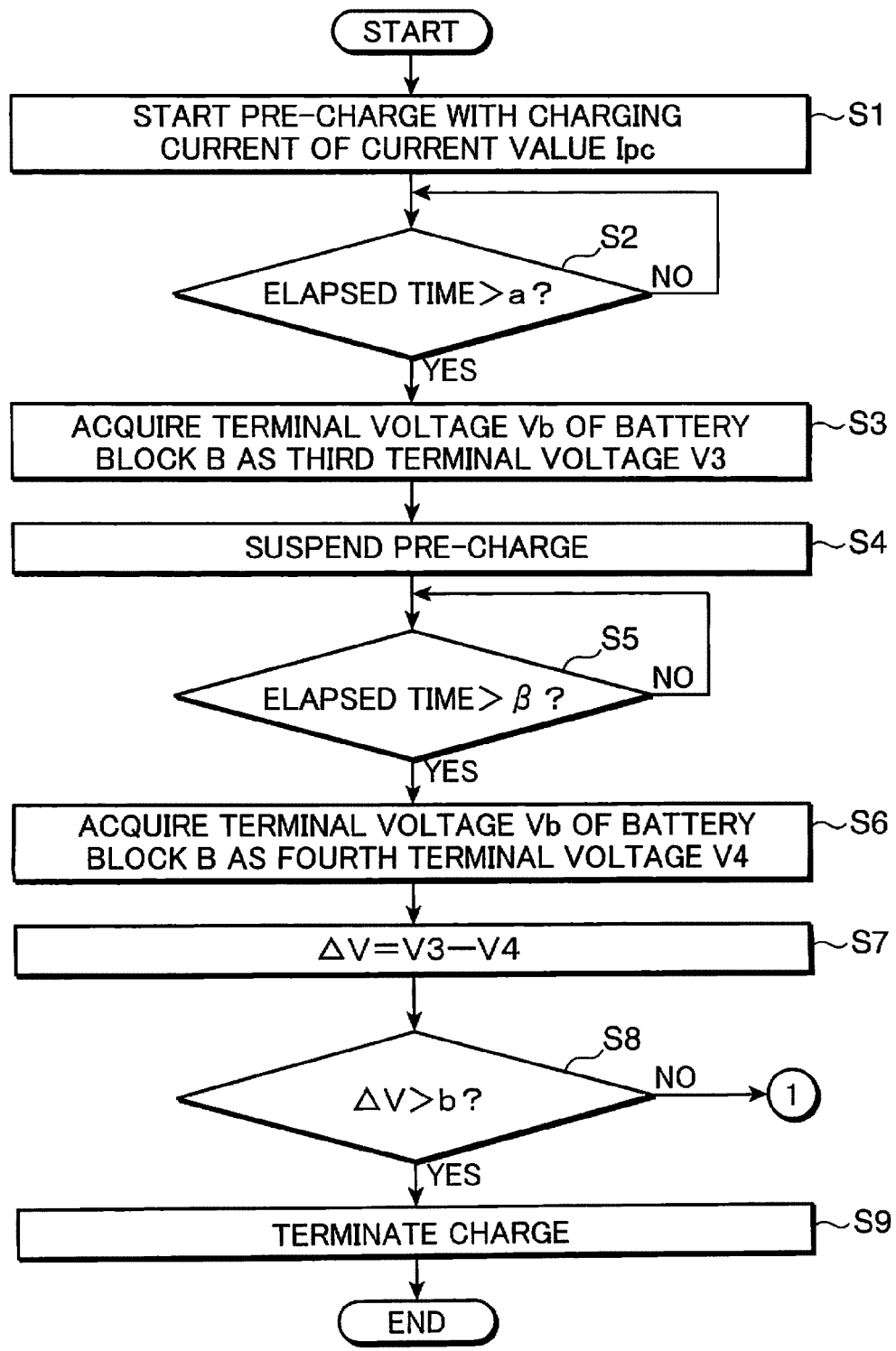
FIG. 4 is a flowchart showing an example of an operation to be performed by the charging system shown in FIG. 1.
Figure 5:
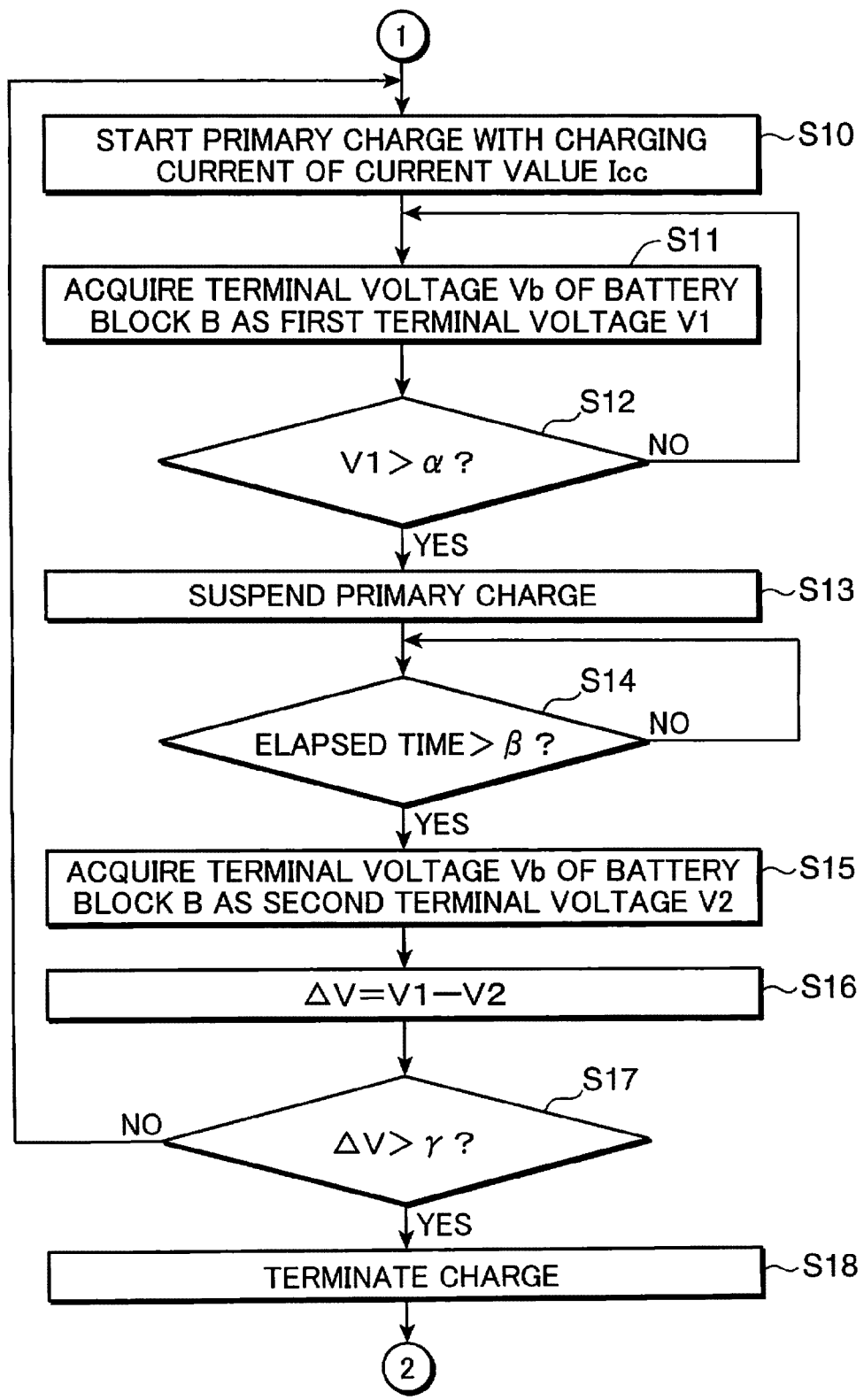
FIG. 5 is a flowchart showing an example of an operation to be performed by the charging system shown in FIG. 1.
Figure 6:
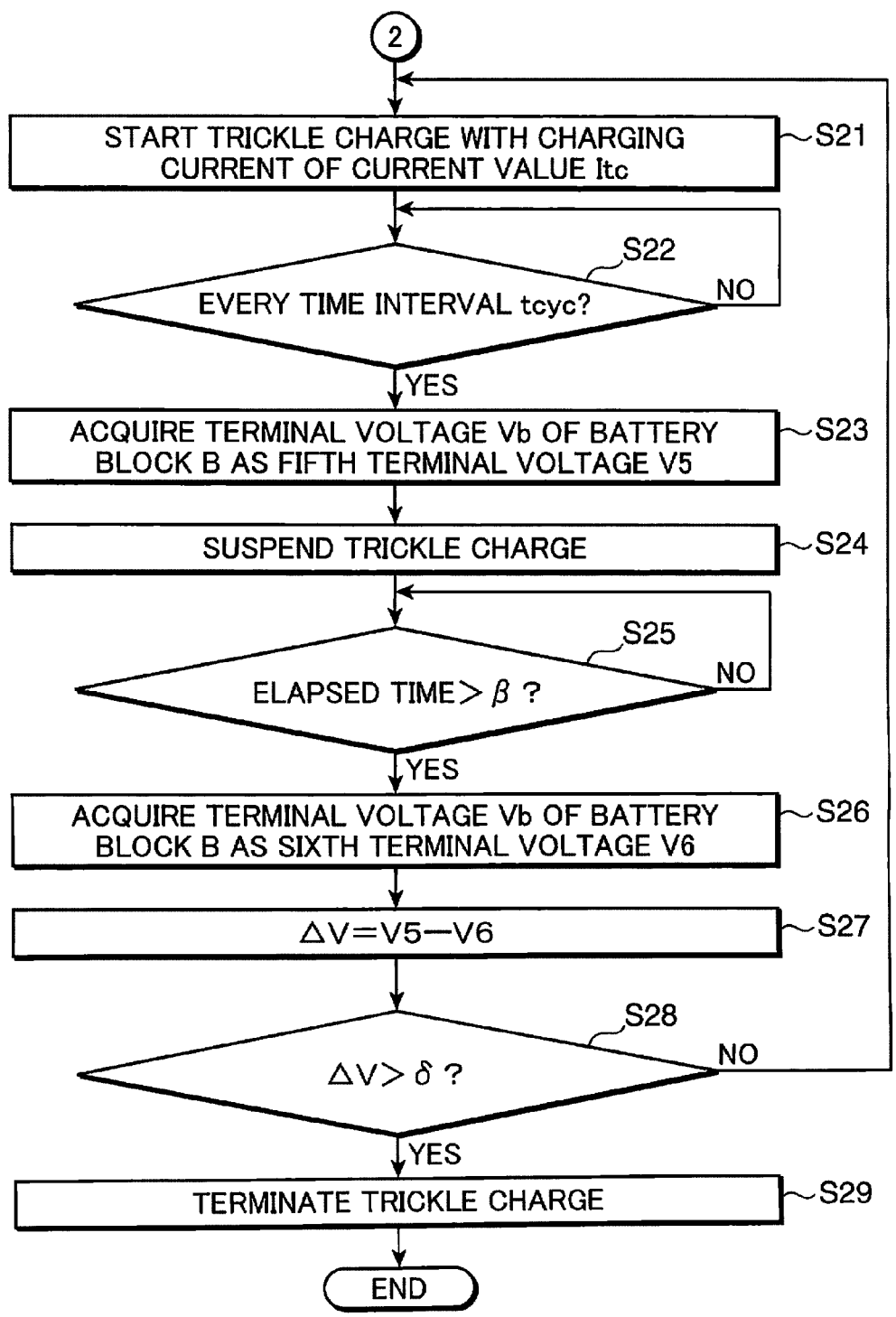
FIG. 6 is a flowchart showing an example of an operation to be performed by the charging system shown in FIG. 1.

Next, an operation to be performed by the charging system having the above configuration is described. FIGS. 4, 5, and 6 are flowcharts showing an exemplified operation to be performed by the charging system shown in FIG. 1. In the following description, the battery blocks B1, B2, ..., and BN are generically called as a battery block B; the terminal voltages Vb1, Vb2, ..., and VbN are generically called as a terminal voltage Vb; the first terminal voltages V1b1, V1b2, ..., and V1bN are generically called as a first terminal voltage V1; the second terminal voltages V2b1, V2b2, ..., and V2bN are generically called as a second terminal voltage V2; the third terminal voltages V3b1, V3b2, ..., and V3bN are generically called as a third terminal voltage V3; the fourth terminal voltages V4b1, V4b2, ..., and V4bN are generically called as a fourth terminal voltage V4; the fifth terminal voltages V5b1, V5b2, ..., and V5bN are generically called as a fifth terminal voltage V5; and the sixth terminal voltages V6b1, V6b2, ..., and V6bN are generically called as a sixth terminal voltage V6.

When a charge of the assembled cell 14 is started, the pre-charging section 212 transmits a signal requesting a charging current of the current value Ipc from the communication section 203 to the charging device 3 through the connection terminals 13 and 32. Upon receiving the signal, the charging device 3 starts a pre-charge of the assembled cell 14 with a charging current of the current value Ipc (Step S1). The current value Ipc is set to a current value smaller than the current value Icc e.g. a current value of about 0.3 C.

Then, upon lapse of a predetermined time "a", e.g. three minutes after the pre-charge has been started (YES in Step S2), the pre-charging section 212 acquires a terminal voltage Vb detected by the voltage detection section 15, as a third terminal voltage V3 (Step S3).

Then, the pre-charge voltage acquiring section 213 transmits a signal requesting to suspend a charge to the charging device 3, whereby the charging current is set to zero by the charging device 3, and the pre-charge is suspended (Step S4). Then, when it is determined that the state of suspending a charge by the charging device 3 is continued over a predetermined set time β (YES in Step S5), the pre-charge voltage acquiring section 213 acquires a terminal voltage Vb detected by the voltage detection section 15, as a fourth terminal voltage V4 (Step S6).

A time equal to or longer than the time "tw" corresponding to a time duration from a point of time when the charging current becomes zero to a point of time when the terminal voltage Vb is stabilized, is predetermined as the set time β. Since the fourth terminal voltage V4 (and the second terminal voltage V2 and the sixth terminal voltage V6 to be described later) is acquired after the terminal voltage Vb has been stabilized, precision of the fourth terminal voltage V4 (and the second terminal voltage V2 and the sixth terminal voltage V6 to be described later) is enhanced.

Then, the primary charge determining section 214 calculates respective voltage differences ΔV by subtracting the fourth terminal voltage V4 from the third terminal voltage V3 with respect to each of the battery blocks B1, B2, ..., and BN (Step S7). Then, the primary charge determining section 214 compares the respective voltage differences ΔV with a predetermined pre-determination voltage "b" (Step S8). For instance, if it is determined that any one of the voltage differences ΔV has exceeded the pre-determination voltage "b" (YES in Step S8), the charge is terminated to avoid an overcharge, because at least one of the battery blocks B1, B2, ..., and BN is presumed to be in a near full charge state (Step S9). The voltage difference ΔV in the secondary battery 141 in a near full charge state in the case where the charging current of the current value Ipc is supplied, is obtained by way of experiment for instance in advance, which is set as the pre-determination voltage "b".

If, on the other hand, it is determined in Step S8 that all the voltage differences ΔV are equal to or smaller than the pre-determination voltage "b" (NO in Step S8), the routine proceeds to Step S10 to perform a primary charge, because there is room for charging the assembled cell 14.

As described above, by performing the operations from Step S1 through Step S9, it is possible to precisely determine a charging state of the assembled cell 14 based on the voltage difference ΔV and to enhance the precision of charge control, even in the case where a secondary battery having a flat voltage characteristic that a change in the terminal voltage is small, as compared with a change in the SOC is charged. Further, the voltage difference ΔV is detected by supplying a charging current of a current value smaller than the current value for a primary charge before the primary charge is performed. Accordingly, a current flowing through the assembled cell 14 is decreased, as compared with an arrangement that a primary charge in Step S10 and thereafter is performed from the start. As a result, even in the case where the assembled cell 14 is already in a full charge state at the time of starting a charge, the possibility that the assembled cell 14 is overcharged and is deteriorated can be reduced.

Then, the primary charge processing section 215 transmits a signal requesting a charging current of the current value Icc from the communication section 203 to the charging device 3 through the connection terminals 13 and 32. Upon receiving the signal, the charging device 3 starts a primary charge of charging the assembled cell 14 with a constant current of the current value Icc (Step S10). Then, the primary charge processing section 215 acquires a terminal voltage Vb detected by the voltage detection section 15, as a first terminal voltage V1 (Step S11).

Then, the charging suspend voltage acquiring section 216 compares the first terminal voltage V1 with a predetermined determination voltage α (Step S12). A voltage approximate to a terminal voltage of the battery block B when the battery block B becomes a full charge state is predetermined as the determination voltage α. And, if it is determined that all the first terminal voltages V1b1, V1b2, ..., and V1bN are equal to or smaller than the determination voltage α (NO in Step S12), the routine proceeds to Step S11 again, whereby the primary charge is continued, because it is presumed that there is room for charging the assembled cell 14.

If, on the other hand, it is determined that at least one of the first terminal voltages V1b1, V1b2, ..., and V1bN has exceeded the determination voltage α (YES in Step S12), the routine proceeds to Step S13 to more precisely determine a state of charge of the battery block B, because it is presumed that at least one of the battery blocks B1, B, ..., and BN is in a near full charge state. And, the charging suspend voltage acquiring section 216 transmits a signal requesting to suspend a charge to the charging device 3, whereby the charging current is set to zero by the charging device 3, and the primary charge is suspended (Step S13).

The secondary battery 141 has a flat characteristic that a change in the terminal voltage is small, as compared with a change in the SOC. Accordingly, although it may be impossible to precisely determine whether or not the battery block B is in a full charge state by merely comparing the first terminal voltage V1 with the determination voltage α, it is possible to determine whether or not the battery block B is in a near full charge state. Consequently, the routine proceeds to Step S13, only if it is determined in Step S12 that at least one of the first terminal voltages V1b1, V1b2, ..., and V1bN has exceeded the determination voltage α, and it is presumed that at least one of the battery blocks B1, B2, ..., and BN may be in a near full charge state. Thus, the possibility that a primary charge is repeatedly suspended unnecessarily is reduced. As a result, the possibility that a charging time is extended is reduced.

Then, if it is determined that the state of suspending a charge by the charging device 3 is continued over the predetermined set time β (YES in Step S14), the charging suspend voltage acquiring section 216 acquires a terminal voltage Vb detected by the voltage detection section 15, as a second terminal voltage V2 (Step S 15).

Then, the charging end determining section 217 calculates respective voltage differences ΔV by subtracting the second terminal voltage V2 from the first terminal voltage V1 with respect to each of the battery blocks B1, B2, . . . , and BN (Step S16). Then, the charging end determining section 217 compares the respective voltage differences ΔV with a predetermined reference voltage γ (Step S17). For instance, if it is determined that any one of the voltage differences ΔV has exceeded the reference voltage γ (YES in Step S17), the charge is terminated to avoid an overcharge, because it is presumed that at least one of the battery blocks B1, B2, . . . , and BN is in a full charge state (Step S18). Then, the routine proceeds to Step S21 to compensate for self discharge of the assembled cell 14.

A voltage difference ΔV of the secondary battery 141 in a full charge state in the case where a charging current of the current value Ipc is supplied, is obtained in advance by way of experiment for instance, which is set as the reference voltage γ.

If, on the other hand, it is determined in Step S17 that all the voltage differences ΔV are equal to or smaller than the reference voltage γ (NO in Step S17), the routine proceeds to Step S10 to resume the primary charge, because it is presumed that there is room for charging the assembled cell 14.

As described above, by performing the operations from Steps S10 through S18, a charging state of the battery block B is determined based on the voltage difference ΔV. This enables to enhance precision of charge control with respect to the assembled cell 14 incorporated with the secondary batteries 141 whose change in the terminal voltage is small, as compared with a change in the SOC.

Then, in Step S21, the auxiliary charge processing section 218 transmits a signal requesting a charging current of the current value Itc from the communication section 203 to the charging device 3 through the connection terminals 13 and 32. Upon receiving the signal, the charging device 3 starts performing an auxiliary charge e.g. a trickle charge of the assembled cell 14 with a charging current of the current value Itc (Step S21). The current value Itc is set to a current value capable of compensating for a self discharging amount of the assembled cell 14 e.g. a current value of about ⅓₀ C.

Then, the routine periodically proceeds to Step S23 every predetermined time interval tcyc, after the auxiliary charge has been started to determine the charging state of the assembled cell 14. The time interval tcyc is set to a time of e.g. about 10 minutes. Then, the auxiliary charge processing section 218 acquires a terminal voltage Vb detected by the voltage detection circuit 15 as a fifth terminal voltage V5 (Step S23).

Then, the auxiliary charging suspend voltage acquiring section 219 transmits a signal requesting to suspend a charge to the charging device 3, which, in turn, sets the charging current to zero to suspend the auxiliary charge (Step S24). Then, when it is determined that the state of suspending a charge by the charging device 3 is continued over the predetermined set time β (YES in Step S25), the auxiliary charging suspend voltage acquiring section 219 acquires a terminal voltage Vb detected by the voltage detection section 15, as a sixth terminal voltage V6 (Step S26).

Then, the recharge determining section 220 calculates respective voltage differences ΔV by subtracting the sixth terminal voltage V6 from the fifth terminal voltage V5 with respect to each of the battery blocks B1, B2, . . . , and BN (Step S27). Then, the recharge determining section 220 compares the respective voltage differences ΔV with the predetermined determination voltage δ (Step S28). For instance, if it is determined that any one of the voltage differences ΔV has exceeded the determination voltage δ (YES in Step S28), the auxiliary charge is terminated to avoid an overcharge, because at least one of the battery blocks B1, B2, . . . , and BN is presumed to be in a full charge state (Step S29). The voltage difference ΔV of the secondary battery 141 in a near full charge state in the case where the charging current of the current value Ipc is supplied, is obtained in advance by way of experiment for instance, which is set as the determination voltage δ.

If, on the other hand, it is determined that all the voltage differences ΔV are equal to or smaller than the determination voltage δ (NO in Step S28), the routine proceeds to Step S21 to resume the auxiliary charge, because it is presumed that there is room for charging in the assembled cell 14.

As described above, by performing the operations from Steps S21 through S29, even in the case where an auxiliary charge for compensating for self discharge such as a trickle charge of a secondary battery whose change in the terminal voltage is small and flat, as compared with a change in the SOC is performed, it is possible to precisely determine a charging state of the assembled cell 14 based on the voltage difference ΔV and to enhance the precision of charge control at the time of performing the auxiliary charge.

In the foregoing, description has been made on a secondary battery having a characteristic that an amount of decrease in the terminal voltage at the time of suspending a charge is increased, as the SOC is increased, as an example of the secondary battery 141. Alternatively, it is possible to use a secondary battery having a characteristic that an amount of decrease in the terminal voltage at the time of suspending a charge is decreased, as the SOC is increased, as an example of the secondary battery 141, by changing the determination conditions in Steps S8, S17, and S28 as necessary.

A charge control circuit according to an aspect of the invention is a charge control circuit that controls a charging section which charges a secondary battery by supplying a charging current to the secondary battery, the charge control circuit comprising: a voltage detection section which detects a terminal voltage of the secondary battery; a primary charge processing section which performs a charge processing of acquiring, as a first terminal voltage, a terminal voltage detected by the voltage detection section while causing the charging section to charge the secondary battery; a charging suspend voltage acquiring section which causes the charging section to suspend the charge after the first terminal voltage has been acquired by the primary charge processing section, and acquires, as a second terminal voltage, a terminal voltage detected by the voltage detection section in a state that the charge is suspended; and a charging end determining section which determines whether or not the charge of the secondary battery is to be terminated, based on a difference between the first terminal voltage acquired by the primary charge processing section and the second terminal voltage acquired by the charging suspend voltage acquiring section.

In the above arrangement, the primary charge processing section acquires, as a first terminal voltage, a terminal voltage of the secondary battery in a state that a charging current is supplied to the secondary battery. The charging suspend voltage acquiring section acquires, as a second terminal voltage, a terminal voltage of the secondary battery in a state that supply of the charging current is suspended. The charging end determining section determines whether or not the charge of the secondary battery is to be terminated, based on a difference between the first terminal voltage and the second terminal voltage. The difference between the first terminal voltage and the second terminal voltage is changed in accordance with the SOC of the secondary battery. Accordingly, even if a secondary battery having a small change in the terminal voltage, as compared with a change in the SOC is used, it is possible to enhance precision of charge control, as compared with charge control based on an SOC which is directly converted from a terminal voltage, by determining whether or not the charge is to be terminated based on a difference between the first terminal voltage and the second terminal voltage.

Preferably, the secondary battery may have a characteristic that an amount of decrease in the terminal voltage at the time of suspending the charge is increased as a state of charge is increased, and the charging end determining section may determine that the charge of the secondary battery is to be terminated, in the case where the difference between the first terminal voltage and the second terminal voltage has exceeded a predetermined reference voltage.

In the above arrangement, since the amount of decrease in the terminal voltage at the time of suspending a charge is increased, as a state of charge (SOC) is increased, the difference between the first terminal voltage and the second terminal voltage is increased, as the SOC is increased. In view of the above, it is possible to enhance precision of charge control, as compared with an arrangement of directly converting a terminal voltage into the SOC, by determining that the charge of the secondary battery is to be terminated, in the case where the difference between the first terminal voltage and the second terminal voltage has exceeded a predetermined reference voltage.

Preferably, the secondary battery may be a lithium ion secondary battery using an olivine-based material as a positive electrode active material.

A lithium ion secondary battery using an olivine-based material as a positive electrode active material is suitable as the secondary battery, because the amount of decrease in the terminal voltage of the lithium ion secondary battery at the time of suspending a charge is increased, as the SOC is increased.

Preferably, the positive electrode active material may be $LiFePO_4$.

A lithium ion secondary battery using $LiFePO_4$ as a positive electrode active material is suitable as the secondary battery, because the amount of decrease in the terminal voltage of the lithium ion secondary battery at the time of suspending a charge is increased, as the SOC is increased.

Preferably, the charging suspend voltage acquiring section may acquire the second terminal voltage, when a state of suspending of the charge by the charging section has continued for a predetermined time, after the first terminal voltage has been acquired by the primary charge processing section.

A terminal voltage of a secondary battery gradually decreases after a charge is suspended, and a certain time is required until the terminal voltage is stabilized at a constant voltage. In view of the above, the charging suspend voltage acquiring section acquires the second terminal voltage, when a state of suspending of the charge by the charging section has continued for a predetermined time. Accordingly, it is possible to acquire the second terminal voltage after the terminal voltage of the secondary battery is stabilized, and hence, it is possible to enhance precision of the second terminal voltage.

Preferably, the charging suspend voltage acquiring section may cause the charging section to suspend the charge and acquire the second terminal voltage, when the first terminal voltage is acquired by the primary charge processing section and the terminal voltage detected by the voltage detection section exceeds a determination voltage predetermined as a voltage indicating that the secondary battery is in a near full charge state.

In the above arrangement, the charge is suspended only if the terminal voltage of the secondary battery has exceeded a determination voltage, and the secondary battery is presumed to be in a near full charge state, and then, charge control based on a difference between the first terminal voltage and the second terminal voltage is performed. Thus, a charge is suspended only if it is roughly determined that the secondary battery is in a near full charge state by a low-precision determination method based on a terminal voltage of the secondary battery. Accordingly, the possibility that a charge is suspended unnecessarily and a charging time is extended is reduced.

Preferably, the primary charge processing section may cause the charging section to supply a charging current of a predetermined current value for a primary charge to the secondary battery to charge the secondary battery with a constant current in performing the charge processing, the charge control circuit may further comprise: a pre-charging section which acquires, as a third terminal voltage, a terminal voltage detected by the voltage detection section while causing the charging section to charge the secondary battery with a charging current of a current value for a pre-charge smaller than the current value for the primary charge, before the charge processing is performed by the primary charge processing section; a pre-charge voltage acquiring section which causes the charging section to suspend the charge after the third terminal voltage has been acquired by the pre-charging section, and acquires, as a fourth terminal voltage, a terminal voltage detected by the voltage detection section in a state that the charging by the charging section is suspended; and a primary charge determining section which determines whether or not the charge processing by the primary charge processing section is to be performed, based on a difference between the third terminal voltage acquired by the pre-charging section and the fourth terminal voltage acquired by the pre-charge voltage acquiring section.

In the above arrangement, the pre-charging section acquires, as a third terminal voltage, a terminal voltage of the secondary battery in a state that a charging current of a current value for a pre-charge smaller than the current value for the primary charge is supplied to the secondary battery, before the charge processing by the primary charge processing section is performed. Further, the pre-charge voltage acquiring section acquires, as a fourth terminal voltage, a terminal voltage of the secondary battery in a state that supply of the charging current is suspended. Further, the primary charge determining section determines whether or not the primary charge by the primary charge processing section is to be performed, based on a difference between the third terminal voltage and the fourth terminal voltage.

As described above, it is possible to determine with high precision whether or not a charge is to be performed with a charging current of the current value for the primary charge based on a difference between the third terminal voltage and the fourth terminal voltage, by supplying, to the secondary battery, a charging current of the current value for the pre-charge smaller than the current value for the primary charge, before the charge with the charging current of the current value for the primary charge is performed. Accordingly, the current flowing through the secondary battery can be reduced, as compared with an arrangement of charging with a charging current of the current value for the primary charge from the start. As a result, it is possible to reduce the possibility that the secondary battery is overcharged and is deteriorated even in the case where the secondary battery is already in a full charge state at the time of starting a charge.

Preferably, the primary charge processing section may cause the charging section to supply a charging current of a predetermined current value for a primary charge to the secondary battery to charge the secondary battery with a constant current in performing the charge processing, the charge control circuit may further comprise: an auxiliary charge processing section which performs an auxiliary charge processing of causing the charging section to charge the secondary battery with a charging current of a current value smaller than the current value for the primary charge and acquiring, as a fifth terminal voltage, a terminal voltage detected by the voltage detection section every predetermined time interval, after the charge of the secondary battery has been determined to be terminated by the charging end determining section; an auxiliary charging suspend voltage acquiring section which causes the charging section to suspend the charge after the fifth terminal voltage has been acquired by the auxiliary charge processing section, and acquires, as a sixth terminal voltage, a terminal voltage detected by the voltage detection section in a state that the charge by the charging section is suspended; and a recharge determining section which determines whether or not the auxiliary charge processing by the auxiliary charge processing section is to be resumed, based on a difference between the fifth terminal voltage acquired by the auxiliary charge processing section and the sixth terminal voltage acquired by the auxiliary charging suspend voltage acquiring section.

In the above arrangement, a decrease of the charging amount resulting from discharging of the secondary battery is compensated, by charging the secondary battery with a charging current of a current value smaller than the current value for the primary charge, after the charging end determining section has determined that the charge of the secondary battery is to be terminated. Further, the auxiliary charge processing section acquires, as a fifth terminal voltage, a terminal voltage of the secondary battery periodically every predetermined time interval in a state that the charging current is supplied to the secondary battery. Further, the auxiliary charging suspend voltage acquiring section acquires, as a sixth terminal voltage, a terminal voltage of the secondary battery in a state that supply of the charging current is suspended. Further, the recharge determining section determines whether or not the auxiliary charge is to be resumed, based on a difference between the fifth terminal voltage and the sixth terminal voltage. Accordingly, it is possible to enhance precision of charge control, as compared with charge control based on an SOC which is directly converted from a terminal voltage, to suppress the possibility of overcharge of the secondary battery by an auxiliary charge processing.

A charging device according to an aspect of the invention includes the charge control circuit described above, and the charging section.

In the above arrangement, it is possible to provide the charging device with enhanced precision of charge control with respect to a secondary battery having a small change in the terminal voltage, as compared with a change in the SOC.

A battery pack according to an aspect of the invention includes the charge control circuit described above, and the secondary battery.

In the above arrangement, it is possible to provide the battery pack with enhanced precision of charge control with respect to a secondary battery having a small change in the terminal voltage, as compared with a change in the SOC.

INDUSTRIAL APPLICABILITY

The invention is suitably applicable to a charge control circuit that controls a charge of a secondary battery, and a battery pack and a charging system incorporated with the charge control circuit in a battery loaded device such as electronic devices including a mobile personal computer, a digital camera, and a mobile phone; vehicles including an electric vehicle and a hybrid electric vehicle; and a power source system, wherein a photovoltaic cell or a power generating device is used in combination with a secondary battery.

What is claimed is:

1. A charge control circuit that controls a charging section which charges a secondary battery by supplying a charging current to the secondary battery, the charge control circuit comprising:
   a voltage detection section which detects a terminal voltage of the secondary battery;
   a primary charge processing section which performs a charge processing of acquiring, as a first terminal voltage, a terminal voltage detected by the voltage detection section while causing the charging section to charge the secondary battery;
   a charging suspend voltage acquiring section which causes the charging section to suspend the charge after the first terminal voltage has been acquired by the primary charge processing section, and acquires, as a second terminal voltage, a terminal voltage detected by the voltage detection section in a state that the charge is suspended; and
   a charging end determining section which determines whether or not the charge of the secondary battery is to be terminated, by comparing a difference between the first terminal voltage acquired by the primary'charge processing section and the second terminal voltage acquired by the charging suspend voltage acquiring section with a reference voltage which is predetermined considering a characteristic of an amount of decrease in the terminal voltage during a predetermined time that has elapsed since suspending the charge of the secondary battery.

2. The charge control circuit according to claim 1, wherein
   the secondary battery has a characteristic that an amount of decrease in the terminal voltage at the time of suspending the charge is increased as a state of charge is increased, and
   the charging end determining section determines that the charge of the secondary battery is to be terminated, in the case where the difference between the first terminal voltage and the second terminal voltage has exceeded the reference voltage.

3. The charge control circuit according to claim 1, wherein the secondary battery is a lithium ion secondary battery using an olivine-based material as a positive electrode active material.

4. The charge control circuit according to claim 1, wherein the secondary battery is a lithium ion secondary battery using $LiFePO_4$ as a positive electrode active material.

5. The charge control circuit according to claim 1, wherein the charging suspend voltage acquiring section acquires the second terminal voltage, when a state of suspending of the charge by the charging section has continued for a predetermined time, after the first terminal voltage has been acquired by the primary charge processing section.

6. The charge control circuit according to claim 1, wherein the charging suspend voltage acquiring section causes the charging section to suspend the charge and acquires the second terminal voltage, when the first terminal voltage acquired by the primary charge processing section exceeds a determination voltage predetermined as a voltage indicating that the secondary battery is in a near full charge state.

7. The charge control circuit according to claim 1, wherein the primary charge processing section causes the charging section to supply a charging current of a predetermined current value for a primary charge to the secondary battery to charge the secondary battery with a constant current in performing the charge processing, the charge control circuit further comprising:
- a pre-charging section which acquires, as a third terminal voltage, a terminal voltage detected by the voltage detection section while causing the charging section to charge the secondary battery with a charging current of a current value for a pre-charge smaller than the current value for the primary charge, before the charge processing is performed by the primary charge processing section;
- a pre-charge voltage acquiring section which causes the charging section to suspend the charge after the third terminal voltage has been acquired by the pre-charging section, and acquires, as a fourth terminal voltage, a terminal voltage detected by the voltage detection section in a state that the charging by the charging section is suspended; and
- a primary charge determining section which determines whether or not the charge processing by the primary charge processing section is to be performed, based on a difference between the third terminal voltage acquired by the pre-charging section and the fourth terminal voltage acquired by the pre-charge voltage acquiring section.

8. The charge control circuit according to claim 1, wherein the primary charge processing section causes the charging section to supply a charging current of a predetermined current value for a primary charge to the secondary battery to charge the secondary battery with a constant current in performing the charge processing, the charge control circuit further comprising:
- an auxiliary charge processing section which performs an auxiliary charge processing of causing the charging section to charge the secondary battery with a charging current of a current value smaller than the current value for the primary charge and acquiring, as a fifth terminal voltage, a terminal voltage detected by the voltage detection section every predetermined time interval, after the charge of the secondary battery has been determined to be terminated by the charging end determining section;
- an auxiliary charging suspend voltage acquiring section which causes the charging section to suspend the charge after the fifth terminal voltage has been acquired by the auxiliary charge processing section, and acquires, as a sixth terminal voltage, a terminal voltage detected by the voltage detection section in a state that the charge by the charging section is suspended; and
- a recharge determining section which determines whether or not the auxiliary charge processing by the auxiliary charge processing section is to be resumed, based on a difference between the fifth terminal voltage acquired by the auxiliary charge processing section and the sixth terminal voltage acquired by the auxiliary charging suspend voltage acquiring section.

9. A charging device comprising:
the charge control circuit according to claim 1; and
the charging section.

10. A battery pack comprising:
the charge control circuit according to claim 1; and
the secondary battery.

* * * * *